United States Patent
Fernandez-Corbaton et al.

(10) Patent No.: US 6,289,280 B1
(45) Date of Patent: Sep. 11, 2001

(54) METHOD AND APPARATUS FOR DETERMINING AN ALGEBRAIC SOLUTION TO GPS TERRESTRIAL HYBRID LOCATION SYSTEM EQUATIONS

(75) Inventors: Ivan J. Fernandez-Corbaton; Alkinoos Hector Vayanos; Parag A. Agashe; Samir S. Soliman, all of San Diego, CA (US)

(73) Assignee: Qualcomm Incorporated, San Diego, CA (US)

( * ) Notice: Subject to any disclaimer, the term of this patent is extended or adjusted under 35 U.S.C. 154(b) by 0 days.

(21) Appl. No.: 09/460,180

(22) Filed: Dec. 10, 1999

(51) Int. Cl.[7] ....................................................... G06G 7/78
(52) U.S. Cl. .................... 701/214; 701/207; 342/357.01; 342/357.02; 342/357.08; 340/988
(58) Field of Search ..................................... 701/214, 207, 701/116, 300; 342/357.01, 357.06, 357.08, 357.09, 357.1, 357.02; 340/988, 991

(56) References Cited

U.S. PATENT DOCUMENTS

| | | | |
|---|---|---|---|
| 5,825,328 | * 10/1998 | Schipper et al. | 342/357.03 |
| 5,986,603 | * 11/1999 | Schipper | 342/357.09 |

* cited by examiner

Primary Examiner—William A. Cuchlinski, Jr.
Assistant Examiner—Yonel Beaulieu
(74) Attorney, Agent, or Firm—Philip Wadsworth; Charles Brown; Bruce Greenhaus (57) ABSTRACT

A method and apparatus for use in a hybrid position location system. The method and apparatus combines measurements from Global Positioning System (GPS) and terrestrial transceiver stations to compute the location of a device. An algebraic solution to hybrid position location system equations is output from the method and apparatus. The method and apparatus determines the position of a device using a non-iterative method, as against the use of a conventional iterative least mean square method. The method of the present invention can be used to solve the location system equations in scenarios where a non-iterative solution is desirable. In certain scenarios, the location system equations may have two possible solutions. An iterative method would converge on one of the solutions, without any indication of the existence of the other ambiguous solution. Moreover, the iterative method may converge on the incorrect of the two ambiguous solutions. Use of the presently disclosed method and apparatus yields both the ambiguous solutions. The disclosed method may be followed up with iterative methods, using the solutions from the algebraic method as initial estimates of the device location for the iterative method. A different process can then select the correct solution. Thus, the algebraic method can be used to detect the existence of ambiguous solutions, and to find both solutions.

5 Claims, 7 Drawing Sheets

METHOD AND APPARATUS FOR DETERMINING AN ALGEBRAIC SOLUTION TO GPS TERRESTRIAL HYBRID LOCATION SYSTEM EQUATIONS

FIELD OF THE INVENTION

The present invention relates generally to locating the position of devices, and specifically to a method and apparatus for determining the position of a device based upon information provided from Global Positioning System (GPS) satellites and associated position location systems.

BACKGROUND OF THE INVENTION

Recent developments in Global Position System (GPS) and terrestrial mobile communications make it desirable to integrate GPS functionality into mobile communications devices such as cellular mobile stations. The cellular geolocation problem can be solved using either network-based methods or using handset-based methods.

Terrestrial Location

Network-based solutions rely on the signal transmitted from the mobile station and received at multiple fixed base stations. This can be accomplished by measuring the Time of Arrival (TOA) of the mobile station signal at the base stations. The mobile will lie on a hyperbola defined by the difference in time of arrival of the same signal at different base stations. An accurate position estimate depends on accurate synchronization and signal structure (bandwidth, etc.).

GPS-based Location

GPS-based location relies on a constellation of 24 satellites (plus one or more in-orbit spares) circling the earth every 12 hours. The satellites are at an altitude of 26,000 km. Each satellite transmits two signals: L1 (1575.42 MHz) and L2 (1227.60 MHz). The L1 signal is modulated with two Pseudo-random Noise (PN) codes-the protected (P) code and the coarse/acquisition (C/A) code. The L2 signal carries only the P code. Each satellite transmits a unique code, allowing the receiver to identify the signals. Civilian navigation receivers use only the C/A on the L1 frequency.

The idea behind GPS is to use satellites in space as reference points to determine location. By accurately measuring the distance from three satellites, the receiver "triangulates" its position anywhere on earth. The receiver measures distance by measuring the time required for the signal to travel from the satellite to the receiver. However, the problem in measuring the travel time is to know exactly when the signal left the satellite. To accomplish this, all the satellites and the receivers are synchronized in such a way that they generate the same code at exactly the same time. Hence, by knowing the time that the signal left the satellite, and observing the time it receives the signal based on its internal clock, the receiver can determine the travel time of the signal. If the receiver has an accurate clock synchronized with the GPS satellites, three measurements from three satellites are sufficient to determine position in three dimensions. Each pseudorange (PR) measurement gives a position on the surface of a sphere centered at the corresponding satellite. The GPS satellites are placed in a very precise orbit according to the GPS master plan. GPS receivers have a stored "almanac" which indicates where each satellite is in the sky at a given time. Ground stations continuously monitor GPS satellites to observe their variation in orbit. Once the satellite position has been measured, the information is relayed back to the satellite and the satellite broadcasts these minor errors "ephemeris" along with its timing information as part of the navigation message.

Figure 1:
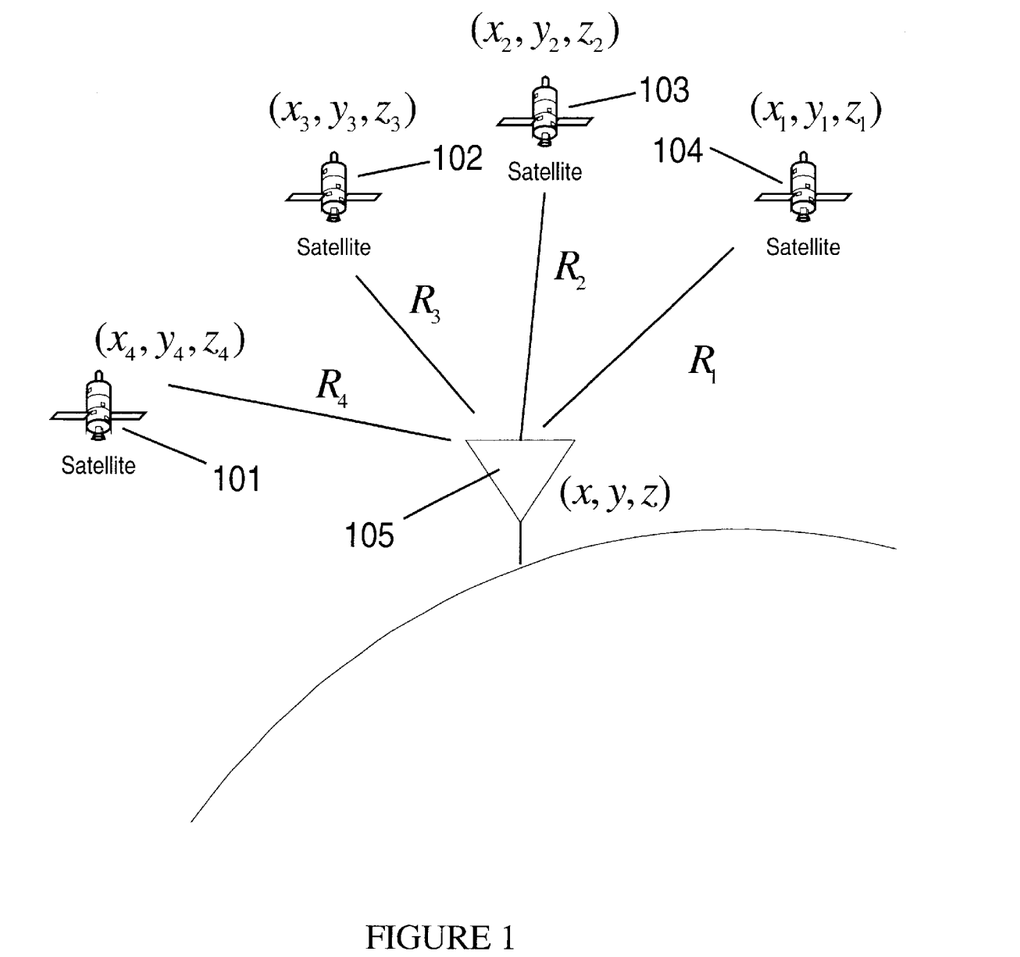
FIG. 1 shows four satellites and a GPS receiver.

It is very expensive to have an accurate clock at the GPS receiver. In practice, GPS receivers measure time of arrival differences from four satellites with respect to its own dock and then solve for both the user's position and the clock bias with respect to GPS time. FIG. 1 shows four satellites 101, 102, 103, 104 and a GPS receiver 105. Measuring time of arrival differences from four satellites involves solving a system of four equations with four unknowns given the PR measurements and satellite positions (satellite data) as shown in FIG. 1. In other words, due to receiver clock error, the four spheres will not intersect at a single point. The receiver then adjusts its clock such that the four spheres intersect at one point.

Hybrid Position Location System

The terrestrial location solution and the GPS solution complement each other. For example, in rural and suburban areas not too many base stations can hear the mobile station, but a GPS receiver can see four or more satellites. Conversely, in dense urban areas and inside buildings, GPS receivers may not detect enough satellites. However, the mobile station can see two or more base stations. The hybrid solution takes advantage of cellular/PCS information that is already available to both the mobile station and the network. Combining GPS and terrestrial measurements provides substantial improvements in the availability of the location solution. The hybrid position location system may combine Round-trip Delay (RTD) and Pilot phase measurements from the terrestrial network with GPS measurements.

The hybrid approach merges GPS and network measurements to compute the location of the mobile station. The mobile station collects measurements from the GPS constellation and cellular/PCS network. These measurements are fused together to produce an estimate of the mobile station position.

When enough GPS measurements are available, it is unnecessary to use network measurements. However, when there are less than four satellites or, in the case of bad geometry, four or more satellite measurements, the measurements must be complemented with network measurements. The minimum number of measurements for obtaining a solution will be equal to the number of unknowns. Since the system has four unknowns (three coordinates and GPS receiver time bias) the minimum number of measurements to obtain a solution will be four. For any satellite measurements that are not available, round trip delay (RTD) measurements may be used to determine the range to a base station. RTD measurements may also be used to provide time aiding information. In addition other information, such as PN offset pseudo-ranges (if time bias is the same as for satellites), PN offset differences (if time bias is different) and altitude aiding may be used to provide additional information and thus increase the number of equations that include the unknowns being sought (i.e., x, y, z, and time offset). As long as the total number of equations is larger than four it will be possible to find a solution.

Round Trip Delay (RTD)

The pilot timing on the forward link of each sector in the base station is synchronized with GPS system time. The mobile station time reference is the time of occurrence, as measured at the mobile station antenna connector of the earliest arriving usable multipath component being used in the demodulation. The mobile station time reference is used as the transmit time of the reverse traffic and access channels.

Figure 2:
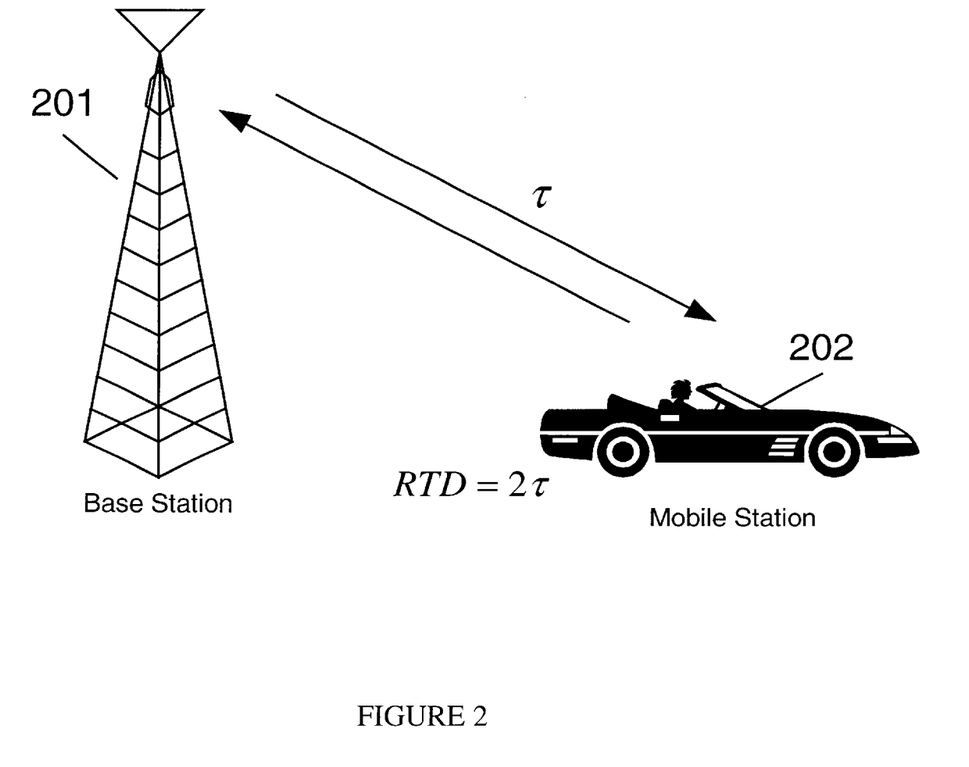
FIG. 2 shows one terrestrial transceiver station and a mobile station.

FIG. 2 shows one terrestrial transceiver station 201 and a mobile station 202. As shown in FIG. 2, the mobile 202 uses the received time reference from the serving base station 201 as its own time reference. Accounting for its own hardware and software delays, the mobile station transmits its signal such that it is received back at the serving base station 201 delayed by a total of $2\tau$, assuming that the forward and reverse links have essentially equal propagation delays. The total delay is measured at the base station by correlating the received signal from the mobile station 202 with the referenced signal at time $T_{sys}$. The measured RTD corresponds to twice the distance between the mobile 202 and the base station 201 (after calibration of base station side hardware delays).

Note that knowledge of the PN of the serving base station can also be used (due to sectorization as a rough angle of arrival (AOA) measurement) to help with resolving ambiguity.

Pilot Phase Measurements

The mobile station is continuously searching for active and neighboring pilots. In the process, it measures the PN offset of each pilot it receives. If the time reference is the same on both PN offset and satellite measurements then the bias on these measurements (as measured at the corresponding antenna connector) will be the same. They can then both be regarded as pseudo-ranges.

Figure 4:
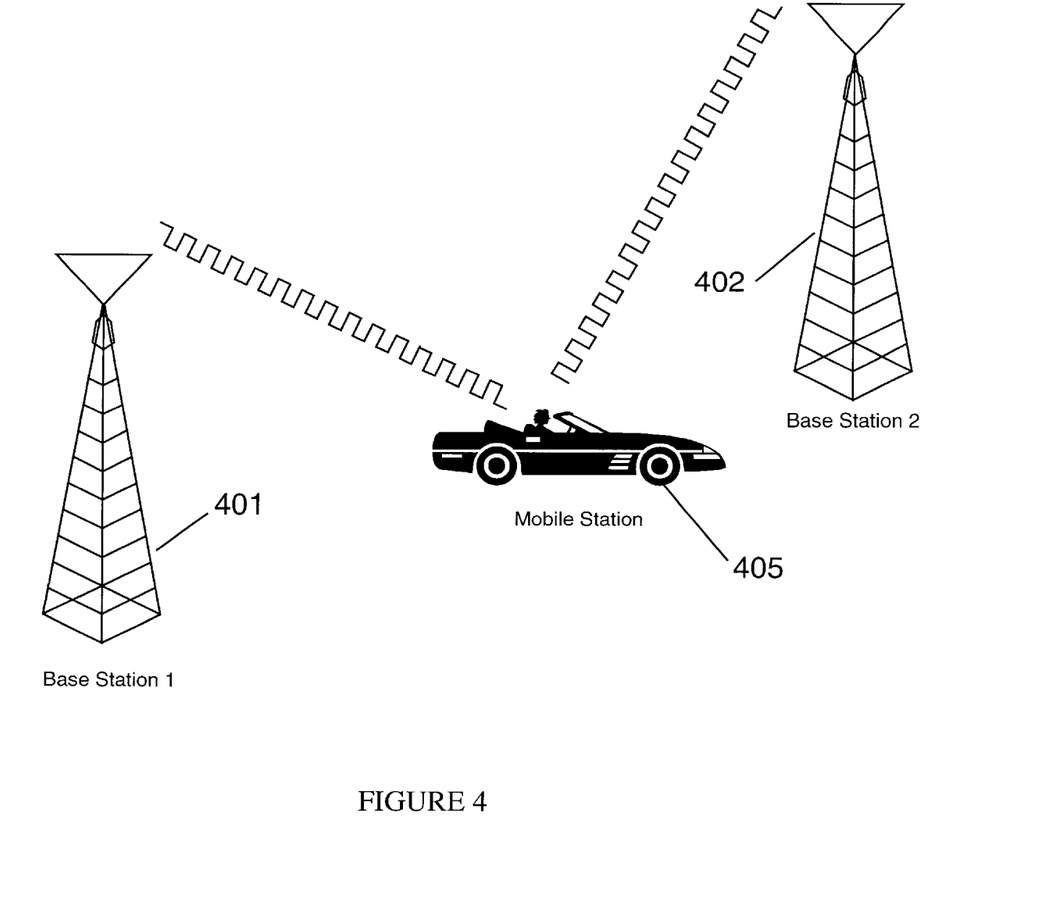
FIG. 4 shows two such base stations and a mobile station.

If the time references are different then we can simply use PN offset differences between each pilot and the reference (earliest arrival) pilot. The pilot PN phase difference is the same as time difference of arrival (TDOA) of the two pilots from the two base stations. FIG. 4 shows two such base stations 401, 402 and a mobile station 405.

Note that on most cellular system's antennas are sectorized and each PN is associated with a sector rather than with a base station. Hence, each measurement can provide, in addition to the TDOA information, some level of angle of arrival information (AOA) that can be used to resolve ambiguity.

Altitude Aiding Measurement

It is always possible to determine with which sector the phone is communicating. This can give an estimate of the phones position to within three to five kilometers. Network planning is usually done based on digital maps of the coverage area. Based on terrain information and knowledge of the sector it is always possible to obtain a good estimate of the user elevation.

3-D Positioning with Three Satellites

Figure 3:
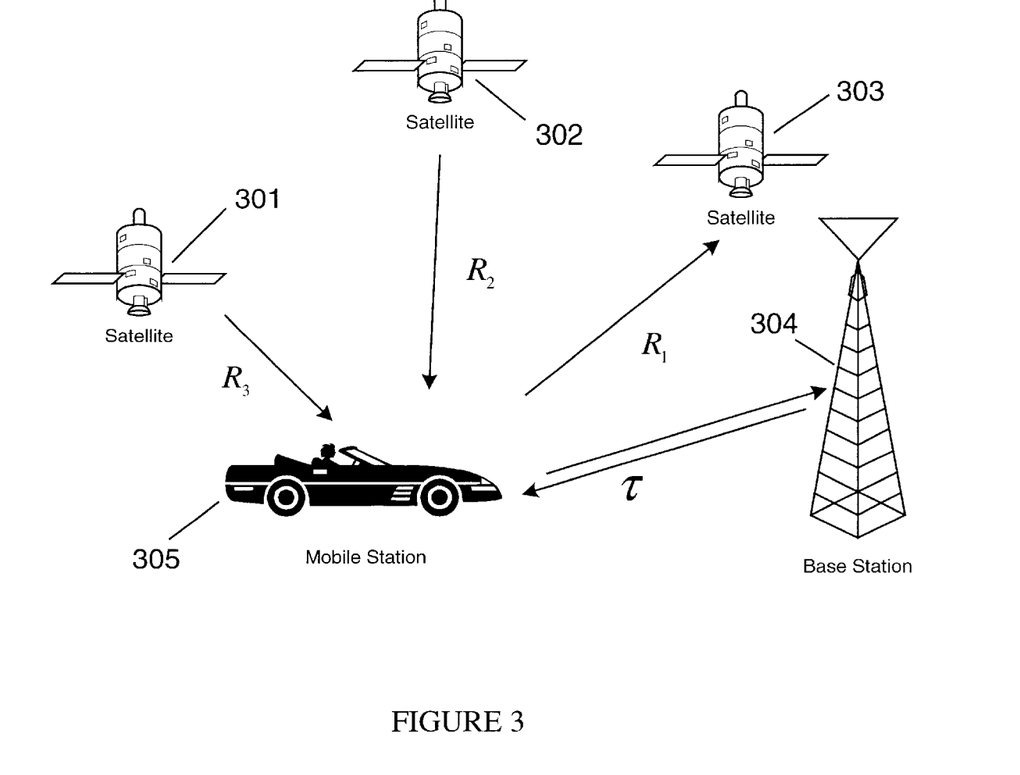
FIG. 3 shows three satellites, a terrestrial transceiver station, and a mobile station.

FIG. 3 shows three satellites 301, 302, 303, a terrestrial transceiver station 304, and a mobile station 305. As shown in FIG. 3, since the mobile station 305 is receiving CDMA signals from at least one base station 304, the mobile 305 will acquire system time. Its sense of system time is delayed with respect to true system time at the serving base station 304 by the propagation delay $\tau$ between the mobile station 305 and base station 304. Once the mobile station 305 tries to access the system, or is on the traffic channel, the propagation delay $\tau$ is estimated by $$\frac{RTD}{2}.$$

This estimate can be used to adjust the mobile system time to correspond to "true" GPS time. Now a mobile clock within the mobile station 305 is synchronized with GPS time; hence only three measurements from three satellites 301, 302, 303 are needed. Note that multipath does not impact the performance of the system because the mobile system time is shifted from GPS time by $\tau$ regardless of whether the signal took a direct path or a reflected path. Instead of the RTD measurement at the base station 30, the mobile station's measurement of the pilot phase offset can be used to reduce to three the number of satellites required.

3-D Positioning with Two Satellites

Figure 5:
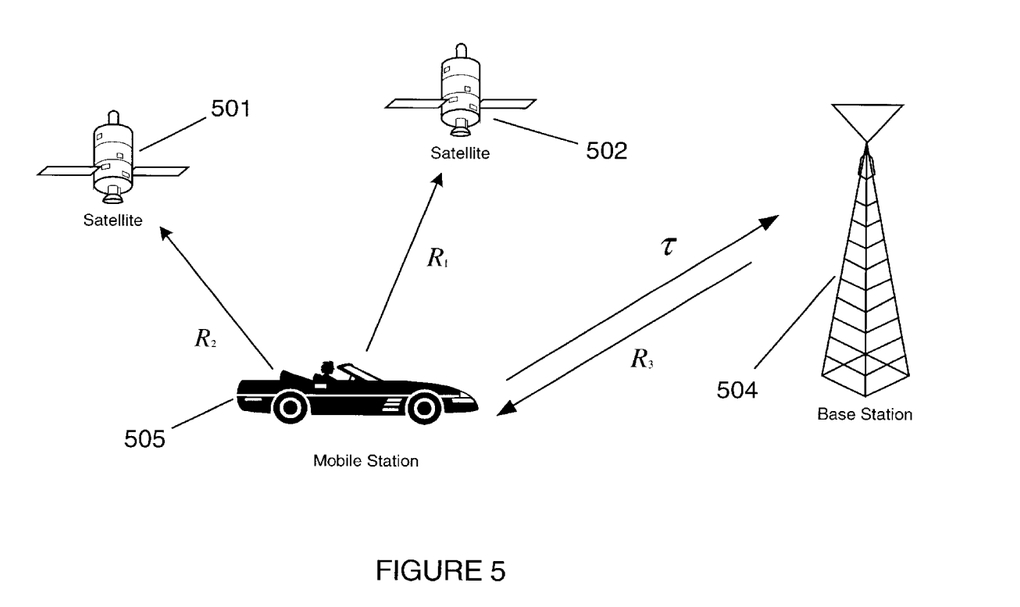
FIG. 5 shows two satellites 501, 502, a base station 504, and a mobile station 505.

In addition to using the RTD to the serving base station for timing, the serving base station can also be used for ranging, as shown in FIG. 5. FIG. 5 shows two satellites 501, 502, a base station 504, and a mobile station 505. The distance to the serving base station 504 is given by $R_3 = C\tau$ where C is the speed of light. Multipath here will impact positioning accuracy. Note that under certain geometry scenarios, we may get two ambiguous solutions. The ambiguity can be resolved by using either sectorization or forward link information. For example, pilot PN phase difference of a neighboring pilot can be used to resolve the resulting ambiguity. Also, pilot phase measurements may be used instead of, or in addition to, the RTD measurement.

3-D Positioning with One Satellite

Figure 6:
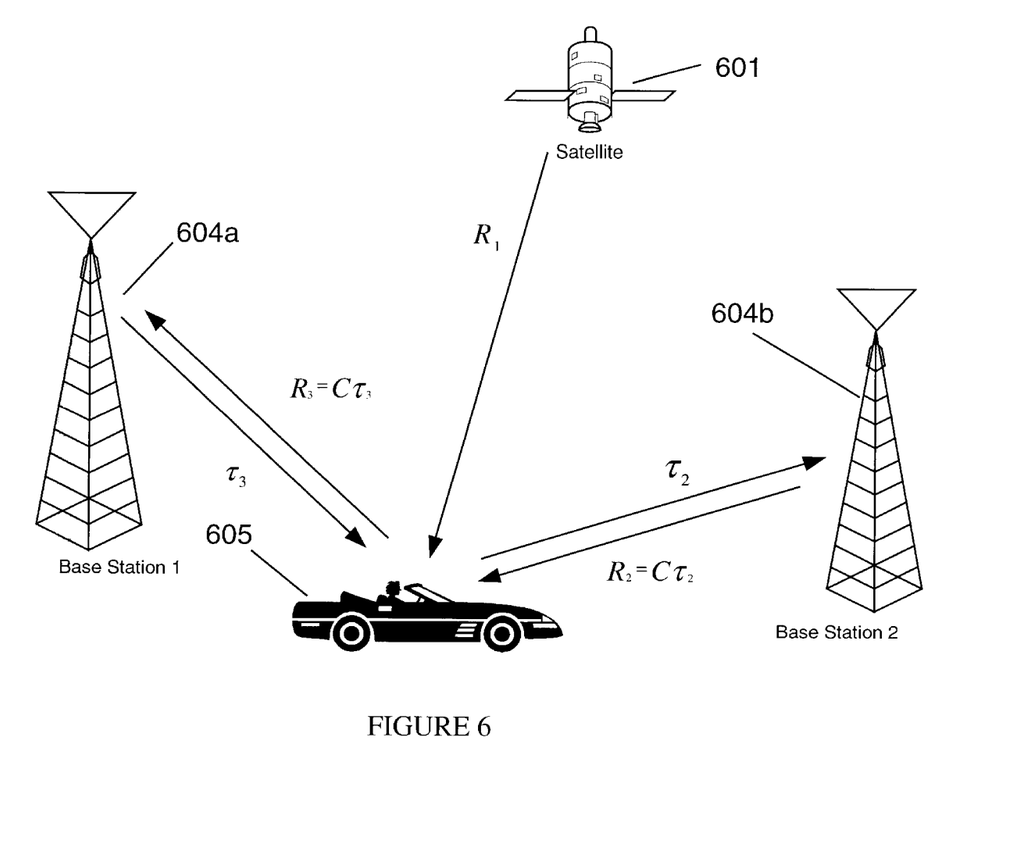
FIG. 6 illustrates a satellite 601, two terrestrial transceiver stations 604, and a mobile station.

In this scenario, the proposed approach requires one additional measurement from the cellular/PCS network. This additional measurement could be either a second RTD measurement or a pilot phase offset on the forward link. FIG. 6 illustrates a satellite 601, two terrestrial transceiver stations 604, and a mobile station 605. To reduce the impact of multipath on the calculated position, the mobile station 605 reports the pilot phase of the earliest arriving path.

When combining different types of measurements, iterative solutions (such as the well-known "Newton-algorithm" based gradient approach) may be used to determine the solution (i.e., the position of the device sought). However, in certain scenarios in which an iterative solution is used, two solutions are possible. Two solutions are possible because of the quadratic nature of the measurements that are used in the iterative equation (i.e., the fact that at least one of the unknowns for which a solution is required are raised to the second power). The possible existence of two solutions creates ambiguity in the solution. That is, it is not clear which of the two solutions represent the location sought. This applies to all the types of positioning systems (except AOA) including the Global Positioning System (GPS).

The existence of ambiguity dependents on the existence of measurement redundancy and on the relative locations of the satellites and terrestrial transceiver stations that provide location information. There is always ambiguity when there is no redundancy in the measurements. However, ambiguity also always exists when there is redundancy, but the geometry is such that the amount of information provided is insufficient, even in light of additional measurements. However, these are rare occurrences.

An iterative method will converge to one of the solutions without any indication of the existence or position of the other solution. The particular solution to which it converges will depend solely on the initial condition used.

In the case of GPS, because of the distance of the satellites, the ambiguous solution is typically very far from the surface of the Earth. It is therefore impossible that the iterative method would converge to the wrong solution if given an initial condition close to the surface of the earth. However, when combining satellite measurements with base station measurements it is very possible that the two ambiguous solutions will be close to each other. The iterative method would thus converge arbitrarily to one of the two solutions without a clear determination as to whether the solution to which it converged was the correct solution, or whether there are two solutions at all.

An exhaustive search can be performed to identify both solutions, if two solutions exist. However, if only one solution exists, it may be necessary to run the Least Mean Square (LMIS) iterative process several times before a determination can be made that only one solution exists.

The algebraic method presented by Bancroft ("An Algebraic Solution of the GPS equations", published by IEEE on Jan. 8, 1984) and by Schipper ("Utilization of Exact Solutions of the Pseudo-range Equations", U.S. Pat. No. 5,914,686, filed Aug. 5, 1997) both require that all measurements have the same time bias. This is a constraining requirement on the types of measurements that can be used with an algebraic method. Accordingly, when measurements from a CDMA communications system base station are being used as one of the sources of information, PN phase measurements are used to determine the pseudo-range to the base station. The use of PN phase measurement requires that the GPS receiver be synchronized with the cellular transceiver not only with respect to clock frequency, but also with respect to clock phase.

As noted above, another measurement that is advantageous to use is the measurement of RTD between the device whose location is being sought and a terrestrial transceiver station, such as a cellular communication base station.

However, since the time bias in the range measurement that results from the measurement of RTD (which is zero) is not the same as the time bias associated with the GPS measurements, the range measurement that is derived from RTD cannot be used in the algebraic solution at all. In order for the algebraic method to be the most useful method for identifying ambiguous solutions, the method should be able to make use of all the measurements that are available.

A more versatile algebraic method and apparatus for performing the method for use with hybrid positioning system equations is therefore described.

SUMMARY OF THE INVENTION

The disclosed method and apparatus is used in a hybrid position location system. The disclosed method and apparatus combines measurements from a Global Positioning System (GPS) and terrestrial transceiver stations to compute the location of a device. An algebraic solution to hybrid position location system equations is output from the disclosed apparatus. The method and apparatus determines the position of a device using a non-iterative method, as against the use of a conventional iterative least mean square method. The method of the present invention can be used to solve the location system equations in scenarios where a non-iterative solution is desirable. In certain scenarios, the location system equations may have two possible solutions. An iterative method would converge on one of the solutions without any indication of the existence of the other ambiguous solution. Moreover, the iterative method may converge on the incorrect one of the two ambiguous solutions. Use of the presently disclosed method and apparatus yields both the ambiguous solutions. The algebraic method may then be followed up with iterative methods, using the solutions from the algebraic method as initial estimates of the device location. A different process can then select the correct solution. Thus, the algebraic method can be used to detect the existence of ambiguous solutions, and to find both solutions.

It should be understood by those skilled in the art that the method and apparatus disclosed is described in the context of a hybrid GPS and cellular location system. However, the disclosed method and apparatus is equally applicable to any location system that combines satellite and terrestrial measurements, such as integrated GPS and Long Range Navigation (LORAN) or other such terrestrial systems.

The present invention will be more fully understood from the following detailed description of the preferred embodiments thereof, taken together with the following drawings.

DETAILED DESCRIPTION OF PREFERRED EMBODIMENTS

Overview

The disclosed method and apparatus is a system that uses both terrestrial transceiver stations and satellites (i.e., a hybrid position location system) to locate the position of a device in a position location system. The presently described method and apparatus is most useful in a hybrid position location system in which there are either not enough satellite measurements to determine a receiver's position or in which a more accurate position can be determined using a combination of satellites and terrestrial transceiver stations, such as base stations of a cellular communication system.

In accordance with the disclosed method and apparatus, an "algebraic" method is used to determine whether two solutions exist and the value of both solutions, without iteration. Accordingly, the use of an algebraic method is preferable for obtaining both ambiguous solutions. The disclosed method and apparatus provides an algebraic (i.e., non-iterative, approximate) solution to a system of navigation equations. The system of navigation equations includes one equation for each of the following: (1) the altitude of the device, as determined by altitude aiding information, (2) satellite measurements; (3) time aiding information (i.e., an estimate of the receiver clock bias); and (4) terrestrial measurements. The disclosed method and apparatus can be used to solve the system of navigation equations in scenarios where a non-iterative solution is desirable.

The approximation proposed here relies on linearizing satellite and altitude aiding measurements around an initial estimate of the user position. Linearizing the satellite and altitude measurements means removing terms that are squared (i.e., raised to a power of two). In one embodiment of the disclosed method and apparatus, the initial estimate of the user position is attained by using information indicating with which sector of a sectorized terrestrial transceiver station the user is communicating (equivalent to information for E911 phase 1). Alternatively, the initial location could be determined by any other means for estimating the location in question, such as previous location fixes, information attained through other position location techniques, etc. In another embodiment of the method and apparatus disclosed, the initial estimate is either the center of the serving sector or the serving base station itself. Accordingly, it should be understood that the estimate can be made using information regarding the location of the serving sector and/or the serving base station or any other information that would provide a reasonable estimation of the location being sought.

An initial estimation based on the location of the serving base station will typically be accurate to within 10–15 kms. The approximation made by linearizing the satellite and altitude aiding measurements is required because algebraic location determination methods can only be applied if the unknowns that are raised to a power of two (i.e., unknowns of the second order) can be grouped together to form a single variable. The variable must be defined the same way in each of the navigation equations. This is not possible in the case in which the four types of navigation equations noted above are presented due to the differences in the form of each of these four equations. Linearizing the satellite and altitude aiding measurements reduces the number of second order unknowns and thus allows the second order unknowns to be grouped together and defined as a quadratic variable having a consistent definition throughout each of the navigation equations.

If one of the solutions is more than 15 km from the reference point, then that solution will be inaccurate. However, such an inaccurate solution will not be the desired solution, since we have predetermined that the solution should be within 15 km of the reference point. In cases in which the reference point cannot be predetermined to be within 15 km of the user (i.e., in systems in which cells have a radius of greater than 15 km, such as in Australia), the accuracy of the approximation can be improved if the altitude information is not approximated by a plane wave approximation.

Accordingly, if the altitude information is linearized, then the ambiguity can be resolved as long as only one of the ambiguous solutions is within 10–15 km of the center of the reference point. If both solutions are within 15 km of the reference point, then the approximations are valid for both solutions. Therefore, the estimates for both solutions are accurate and one solution cannot be selected over the other. Therefore, other criteria must be used to distinguish the desired solution from the erroneous solution.

Once an approximate solution is determined, the approximate solution can be used as the initial condition for determining a more accurate iterative solution. Using the solutions from the approximate solution as initial estimates of the mobile station location provides a rapid convergence to a solution that lacks the error introduced by the approximation.

Some of the criteria that can be used to identify the correct solution include, but are not limited to: (1) sector angle opening (i.e., the angular size of the sector) and orientation, (2) distance to serving base station relative to expected cell size, (3) relative LMS cost of the two solutions in the case where there is redundancy, (4) received signal power and (5) Coverage maps available for network planning. Coverage maps would constitute the optimal criterion.

Although the description of the method in this document uses a hybrid GPS and cellular location system as an example, it can easily be applied to any location system that combines satellite and terrestrial measurements, such as integrated GPS and LORAN.

There are different types of terrestrial measurements. These may be treated as belonging to one of three categories: ranges, pseudo-ranges or range-differences. In addition, estimates of the clock bias and/or the altitude may be available. The algebraic method and apparatus described below can handle any of the following combinations of satellite and base station measurements:

1. Terrestrial measurements and satellite measurements as pseudoranges with the same bias (with or without the plane-wave approximation).
2. Terrestrial measurements as range differences and satellite measurements as pseudoranges (using the plane-wave approximation)
3. Terrestrial measurements as ranges and satellite measurements as pseudoranges (using the plane-wave approximation). This corresponds to the case in which Pseudo-random Noise (PN) offset differences (different bias than satellites) and RTD are both available. Range measurements are then used to convert all the range differences into ranges.

To any of these measurement combinations can also be added:

Clock bias estimate

Altitude aiding (approximating the earth as a plane)

The techniques described in this document can be extended to other types of measurements.

Definitions

In this section, notations are defined that are used throughout the rest of this document. The subscript "s" is used to denote the satellite measurements and satellite locations. The subscript "b" is used to denote the base station measurements and base station locations. The symbols r,ρ,δ are used to represent ranges, pseudo-ranges and range differences respectively. The coordinates of an entity are denoted as $\bar{x}_{ent}=[x_{ent}\ y_{ent}\ z_{ent}]$. The system unknowns are represented as $\bar{u}=[\bar{x}\ b]^T=[x\ y\ z\ b]^T$. The variable b represents the satellite measurement time bias. The letter "b" will also be used for base station measurements in the case where it can be assumed that the bias is the same as it is for satellite measurements. Conventional notation and conventional definitions are used for the norm of a vector: $|\bar{x}_i|=\sqrt{x_i^2+y_i^2+z_i^2}$ and the dot product of two vectors: $<\bar{x}_i, \bar{x}_j>=x_ix_j+y_iy_j+z_iz_j$.

The approximations that are being made in the manipulation of the navigation equations assume that an estimate of the receiver position is available that is accurate to within 10–15 kms. In general, the sector with the earliest time of arrival at the phone will be referred to as the serving sector. The reference point will be the center of the coverage area of the serving sector. Note that if the size of the sector is larger than 10–15 km, then it may be necessary to run an iteration of the disclosed method wherein the reference point is updated according to the result. In general however this will not be necessary.

Altitude Aiding

An estimate of the altitude of the mobile station may be available from terrain information, previous location solutions, or other sources or measurements. If the mobile location $\bar{x}_m=[x_m\ y_m\ Z_m]$ is defined in Earth Centered Earth Fixed (ECEF) coordinates, the estimate of the altitude is an estimate of $|\bar{x}_m|$. In order to include altitude aiding in the algebraic solution, we must express the altitude aiding equation as a linear equation so that it will not restrict the choice of the algebraic method quadratic term. This can be achieved by rotating the coordinate frame such that the altitude estimate becomes a linear combination of the unknowns in the system of equations (within a certain radius of the rotation reference point).

We rotate the ECEF coordinate frame such that the Z-axis passes through a point selected as an initial estimate of the location of the mobile station. In the case of a hybrid location system using terrestrial transceiver stations, such as cellular base stations, and GPS satellites, this initial estimate can be a point in the coverage area of a selected base station. If the base station measurements are pseudo-ranges or ranges then the center of the serving sector can be used as initial estimate. If the base station measurements are range-differences, then the serving base station (range-difference reference) will have to be used as the initial estimate. This is due to the constraints imposed by the method in the case of range-difference measurements.

If the initial estimate of the mobile station location is close to the true location of the mobile station, then the estimate of the mobile station altitude is an estimate of the Z coordinate of the mobile station in the new rotated coordinate frame. It is obvious that linearization can alternatively be accomplished by transforming the altitude estimate to an estimate of the X coordinate or the Y coordinate of the mobile station (instead of the Z coordinate, as described above). The rotation matrix T is computed as follows:

If $\bar{r}_0 = [x_0 \ y_0 \ z_0]$ represents the ECEF coordinates of the initial estimate for the mobile station location, then these coordinates can be transformed to a spherical coordinate system as follows. If $\theta$, $\phi$ and r are the coordinates in the spherical coordinate frame, then:

$$r = \sqrt{x_0^2 + y_0^2 + z_0^2} \tag{3}$$

The rotation matrix can be expressed as a function of the spherical coordinates:

$$T = \begin{bmatrix} \cos(\theta)\cos(\phi) & \cos(\theta)\sin(\phi) & -\sin(\theta) \\ -\sin(\phi) & \cos(\phi) & 0 \\ \sin(\theta)\cos(\phi) & \sin(\theta)\sin(\phi) & \cos(\theta) \end{bmatrix} \tag{4}$$

Use the rotation matrix T to compute the new coordinates of all satellites and base stations in the rotated coordinate system.

$$\bar{s}_{iT} = T \cdot (\bar{s}_i - \bar{r}_0) \tag{5}$$

$\bar{s}_i$ represents the coordinates of satellite i in ECEF coordinates, and $\bar{s}_{iT}$ represents the coordinates of satellite i in the rotated coordinate system. Accordingly, Equation (5) represents the coordinates of satellite i in the rotated coordinate system, as calculated from the coordinates of the satellite in ECEF coordinates. An estimate is thus provided for the Z coordinate of the mobile station in the rotated coordinate system. The estimate of the Z coordinate can be taken into account simply by adding a new linear equation, $\hat{z} = z$, to the system of equations. One goal of the present method is to define system equations in terms of $\lambda$. Equation 6a provides a means for expressing the location sought in terms of the linear variable, $\lambda$. The variables $A_A$, $l_a$, and $c_a$ are selected to make the equality true.

$$A_A \bar{u} = l_a \lambda + c_a \tag{6a}$$

In Equation 6b, $A_A$ is equal to the one-dimensional matrix $[0 \ 0 \ 1 \ 0]$, $\lambda$ is equal to the one dimensional matrix including the four unknowns x, y, z, and b, $l_a$ is equal to zero, and $c_a$ is equal to $\hat{z}$.

$$A_A \bar{u} = l_a \lambda + c_a \Leftrightarrow [0 \ 0 \ 1 \ 0] \begin{bmatrix} x \\ y \\ z \\ b \end{bmatrix} = 0 \cdot \lambda + \hat{z} \tag{6b}$$

The form of Equation 6b makes it easier to combine the altitude information with the other information that is known, such as the satellite measurements and the base station measurements, as will be seen below.

Satellite Measurements

Let $[x_m \ y_m \ z_m]$ be the location of the mobile station whose location is sought and let $[x_{si} \ y_{si} \ z_{si}]$ be the location of a satellite $S_i$. Let b be the receiver clock bias. Accordingly, the pseudo-range measurement to each satellite, $\rho_i$, where $i = 1, \ldots, n$, can be expressed as:

$$\rho_{si} = \sqrt{(x_{si} - x_m)^2 + (y_{si} - y_m)^2 + (z_{si} - z_m)^2} + b, \ i = 1, \ldots, n \tag{7}$$

Because the satellites are far away from the Earth, it is reasonable to use a plane-wave approximation. The plane-wave approximation assumes that, instead of a sphere at a distance from the satellite, the satellite measurement surface is a plane at a distance from the satellite.

A vector is defined as $$\bar{v}_{si} = \frac{\bar{x}_r - \bar{x}_{si}}{|\bar{x}_r - \bar{x}_{si}|},$$

the line of sight vector going from the satellite to the reference. The satellite measurement equation can be written as:

$$\langle \bar{x} - \bar{x}_{si}, \bar{v}_{si} \rangle + b = \rho_{si} \tag{8a}$$

It will be understood that Equation 8b follows from Equation 8a.

$$\langle \bar{x}, \bar{v}_{si} \rangle + b = \rho_{si} + \langle \bar{x}_{si}, \bar{v}_{si} \rangle \tag{8b}$$

A system of equations can be written in the following form that express the relationship of each set of satellite measurements to the location that is sought:

$$A_s \bar{u} = \bar{c}_s \tag{9a}$$

Writing Equation 8b in the form of Equation 9a for each of a plurality of satellites $s_1$ through $s_n$ results in:

$$\begin{bmatrix} \bar{v}_{s1}(1) & \bar{v}_{s1}(2) & \bar{v}_{s1}(3) & 1 \\ \bar{v}_{s2}(1) & \bar{v}_{s2}(2) & \bar{v}_{s2}(3) & 1 \\ \vdots & \vdots & \vdots & \vdots \\ \bar{v}_{sn}(1) & \bar{v}_{sn}(2) & \bar{v}_{sn}(3) & 1 \end{bmatrix} \begin{bmatrix} x \\ y \\ z \\ b \end{bmatrix} = \begin{bmatrix} \rho_{s1} + \langle \bar{x}_{s1}, \bar{v}_{s1} \rangle \\ \rho_{s2} + \langle \bar{x}_{s2}, \bar{v}_{s2} \rangle \\ \vdots \\ \rho_{sn} + \langle \bar{x}_{sn}, \bar{v}_{sn} \rangle \end{bmatrix} \tag{9b}$$

Time Aiding

An RTD measurement made at the reference base station can be used to estimate the bias in the mobile station clock. An RTD measurement is made by measuring the amount of time required for a signal transmitted from a base station to reach a mobile station, be retransmitted by the mobile station, and be received by the base station, assuming a synchronous retransmission (i.e., the transmitted and received signals are synchronous) by the mobile station. If an assumption is made that the propagation time is equal in both directions, then the amount of time required for signals to travel from the base station to the mobile station can be determined from the one half the RTD measurement. Accordingly, since the mobile station clock is offset from the base station clock by the amount of time required for a signal to traverse the distance between the base station and the mobile, the mobile station clock bias with respect to the base station can be determined. It should be noted that the mobile station clock is used as the time reference to measure the GPS pseudoranges. Accordingly:

$$\hat{b} = \frac{RTD}{2}, \quad (10)$$

where $\hat{b}$ is an estimate of the bias b in the time reference used to perform GPS pseudorange measurements. Estimates of the clock bias may also be available from other sources or measurements, such as previous navigation solutions. The estimate of the dock bias can be taken into account simply by expressing a new linear equation, $\hat{b}=b$, in the form used for the system of equations. Here, $$A_T \bar{u} = l_t \lambda + c_t \Leftrightarrow [\,0\ \ 0\ \ 0\ \ 1\,]\begin{bmatrix} x \\ y \\ z \\ b \end{bmatrix} = 0 \times \lambda + \hat{b} \quad (11)$$

Terrestrial Measurements and System Resolution

The terrestrial measurements can be treated in three ways:

1. Terrestrial pseudoranges
2. Terrestrial ranges
3. Terrestrial time difference of arrivals.

Terrestrial Measurements as Pseudo-Ranges

Pilot phase measurements made by the mobile station can be treated as pseudoranges. In a system using both GPS and LORAN, LORAN measurements may be treated as pseudoranges. If the terrestrial measurements are treated as pseudoranges, they can be expressed as:

$$\rho_{bi} = |\bar{x} - \bar{x}_{bi}| + b_t, \quad (12)$$

where $b_t$ is the bias on each measurement.

For each one of the measurements we perform the following manipulation. First subtract $b_t$ from both sides. Then square both sides of the equation, resulting in:

$$(\rho_{bi} - b_t)^2 = |\bar{x} - \bar{x}_{bi}|^2 \quad (13a)$$

Next, each side is expanded, resulting in:

$$\rho_{bi}^2 - 2\rho_{bi}b_t + b_t^2 = |\bar{x}|^2 - 2<\bar{x},\bar{x}_{bi}> + |\bar{x}_{bi}|^2 \quad (13b)$$

Next, all of the second order terms are collected on the right side of the equation:

$$2<\bar{x},\bar{x}_{bi}> - 2\rho_{bi}b_t = |\bar{x}|^2 - b_t^2 + |\bar{x}_{bi}|^2 - \rho_{bi}^2 \quad (13c)$$

A quadratic variable, $\lambda = |\bar{x}|^2 - b_t^2$, is defined. Equation (13c) can be written as:

$$2<\bar{x},\bar{x}_{bi}> - 2\rho_{bi}b_t = \lambda + |\bar{x}_{bi}|^2 - \rho_{bi}^2 \quad (14)$$

We can perform the operations in Equations (13) and (14) on the pseudo-range measurements for each base station. Accordingly, the system of equations for a plurality of base stations, b1 through bn can then be expressed in the desired form as:

$$A_B \bar{u} = \bar{l}_b \lambda + \bar{c}_b \Leftrightarrow \quad (15)$$

$$\begin{bmatrix} 2x_{b1} & 2y_{b1} & 2z_{b1} & -2\rho_{b1} \\ 2x_{b2} & 2y_{b2} & 2z_{b2} & -2\rho_{b2} \\ \vdots & \vdots & \vdots & \vdots \\ 2x_{bn} & 2y_{bn} & 2z_{bn} & -2\rho_{bn} \end{bmatrix} \begin{bmatrix} x \\ y \\ z \\ b_t \end{bmatrix} = \begin{bmatrix} 1 \\ 1 \\ \vdots \\ 1 \end{bmatrix} \lambda + \begin{bmatrix} |\bar{x}_{b1}|^2 - \rho_{b1}^2 \\ |\bar{x}_{b2}|^2 - \rho_{b2}^2 \\ \vdots \\ |\bar{x}_{bn}|^2 - \rho_{bn}^2 \end{bmatrix}$$

The altitude aiding, satellite and time bias measurement equations as defined in Equations (6), (9), and (11), respectively, can be added to the system at this stage. Note that in this case it is not necessary to use the plane-wave approximation for the satellite measurements since the quadratic term would be the same anyway. Hence, the same manipulations that were applied here to base station measurements can also be performed for satellite measurements.

The sets of equations can be concatenated so as to obtain a single set of equations:

$$A\bar{u} = \bar{l}\lambda + \bar{c} = \begin{bmatrix} A_S \\ A_B \\ A_T \\ A_A \end{bmatrix} \bar{u} = \begin{bmatrix} \bar{0} \\ \bar{l}_b \\ 0 \\ 0 \end{bmatrix} \lambda + \begin{bmatrix} \bar{c}_s \\ \bar{c}_b \\ c_t \\ c_a \end{bmatrix} \quad (16)$$

Let B be the generalized inverse of A (note that the covariance matrix in this case is not the same as the covariance matrix of the measurements), then:

$$\bar{u} = B \times (\bar{l}\lambda + \bar{c}) = B \times \bar{l}\lambda + B \times \bar{c} = \bar{p}\lambda + \bar{q} \quad (17)$$

We define a pair of vectors d and e that represent the x, y, and z, components of the vectors p and q as follows:

$$\begin{cases} \bar{d} = [\,\bar{p}(1)\ \ \bar{p}(2)\ \ \bar{p}(3)\,]^T \\ \bar{e} = [\,\bar{q}(1)\ \ \bar{q}(2)\ \ \bar{q}(3)\,]^T \end{cases} \quad (18a)$$

and a pair of scalars f and g that represent the offset b of the vectors p and q as follows:

$$\begin{cases} f = \bar{p}(4) \\ g = \bar{q}(4) \end{cases} \quad (18b)$$

Therefore, we can see that:

$$\bar{x} = \bar{d}\lambda + \bar{e} \quad (18c)$$

$$|\bar{x}|^2 = |\bar{d}\lambda + \bar{e}|^2 \quad (18d)$$

Therefore, substituting Equation 18b into the definition of $\lambda$ results in:

$$\lambda = |\bar{x}|^2 - b_t^2 = |\bar{d}\lambda + \bar{e}|^2 - (f\lambda + g)^2 = |\bar{d}|^2\lambda^2 + 2<\bar{d},\bar{e}>\lambda + |\bar{e}|^2 - (f^2\lambda^2 + 2fg\lambda + g^2) \quad (19a)$$

We then collect all of the terms associated with $\lambda^2$ together, all of the terms associated with $\lambda$, and all of the terms that are unassociated with $\lambda$ on the left side of the equation.

$$(|\bar{d}|^2 - f^2)\lambda^2 + (2<\bar{d},\bar{e}> - 2fg - 1)\lambda + |\bar{e}|^2 - g^2 = 0 \quad (19b)$$

$$(|\bar{d}|^2 - f^2)\lambda^2 + (2<\bar{d},\bar{e}> - 2fg - 1)\lambda + |\bar{e}|^2 - g^2 = 0$$

Equation (19b) is a second order equation in $\lambda$ and has the following solutions:

$$\lambda_1 = \frac{-(2<\bar{d},\bar{e}>-2fg-1)+\sqrt{(2<\bar{d},\bar{e}>-2fg-1)^2-4(|\bar{d}|^2-f^2)(|\bar{e}|^2-g^2)}}{2(|\bar{d}|^2-f^2)} \quad (20)$$

$$\lambda_2 = \frac{-(2<\bar{d},\bar{e}>-2fg-1)-\sqrt{(2<\bar{d},\bar{e}>-2fg-1)^2-4(|\bar{d}|^2-f^2)(|\bar{e}|^2-g^2)}}{2(|\bar{d}|^2-f^2)}$$

We can find the solutions that correspond to these two values of $\lambda$ by substituting them into the definition of the system variables as a function of $\lambda$:

$$\bar{u}_1 = \bar{p}\lambda_1 + \bar{q}$$

$$\bar{u}_2 = \bar{p}\lambda_2 + \bar{q} \quad (21)$$

To distinguish the correct solution, we substitute these two solutions back into the system of equations to find the solution that yields very small residuals. If both solutions yield small residuals, the system has two ambiguous solutions.

Terrestrial Measurements as Ranges

RTD measurement performed by a base station can be used to estimate the distance between the mobile station and the base station. The RTD measurement made at the reference base station can be treated as a range measurement. The RID measurement made at the reference base station can be combined with mobile station's measurement of the time difference of arrival of the pilot signal from the reference base station and other base stations to obtain ranges to other base stations.

Note that in this case we do not need to use the approximation for altitude aiding described above.

If the terrestrial measurements are treated as ranges, they can be expressed in the form:

$$r_{bi} = |\bar{x} - \bar{x}_{bi}| \quad (22)$$

For each one of the measurements we can perform the following manipulation:

$$r_{bi}^2 = |\bar{x} - \bar{x}_{bi}|^2 \quad (23a)$$

The term on the right side of the equation is then expanded:

$$r_{bi}^2 = |\bar{x}|^2 - 2<\bar{x},\bar{x}_{bi}> + |\bar{x}_{bi}|^2 \quad (23b)$$

The second order terms are then collected and isolated on the right side of the equation:

$$2<\bar{x},\bar{x}_{bi}> = |\bar{x}|^2 + |\bar{x}_{bi}|^2 - r_{bi}^2 \quad (23c)$$

A quadratic variable is defined as $\lambda = |\bar{x}|^2$. Equation (23c) can be expressed as:

$$2<\bar{x},\bar{x}_{bi}> = \lambda + |\bar{x}_{bi}|^2 - r_{bi}^2 \quad (24)$$

We can perform the operations in Equations (23) and (24) for all the range measurements. The system of equations can then be written as:

$$A_B \bar{u} = \quad (25)$$

$$\bar{l}_b \lambda + \bar{c}_b \Leftrightarrow \begin{bmatrix} 2x_{b1} & 2y_{b1} & 2z_{b1} & 0 \\ 2x_{b2} & 2y_{b2} & 2z_{b2} & 0 \\ \vdots & \vdots & \vdots & \vdots \\ 2x_{bn} & 2y_{bn} & 2z_{bn} & 0 \end{bmatrix} \begin{bmatrix} x \\ y \\ z \\ b \end{bmatrix} = \begin{bmatrix} 1 \\ 1 \\ \vdots \\ 1 \end{bmatrix} \lambda + \begin{bmatrix} |\bar{x}_{b1}|^2 - r_{b1}^2 \\ |\bar{x}_{b2}|^2 - r_{b2}^2 \\ \vdots \\ |\bar{x}_{bn}|^2 - r_{bn}^2 \end{bmatrix}$$

The altitude aiding, satellite and time bias measurement equations as defined in Equations (6), (9), and (11), respectively, can be added to the system at this stage. The sets of equations can be concatenated so as to obtain a single set of equations:

$$A\bar{u} = \bar{l}\lambda + \bar{c} = \begin{bmatrix} A_S \\ A_B \\ A_T \\ A_A \end{bmatrix} \bar{u} = \begin{bmatrix} \bar{0} \\ \bar{l}_b \\ 0 \\ 0 \end{bmatrix} \lambda + \begin{bmatrix} \bar{c}_s \\ \bar{c}_b \\ c_t \\ c_a \end{bmatrix} \quad (26)$$

Let B be the generalized inverse of A (note that the covariance matrix in this case is not the same as the covariance matrix of the measurements), then:

$$\bar{u} = B \times (\bar{l}\lambda + \bar{c}) = B \times \bar{l}\lambda + B \times \bar{c} = \bar{p}\lambda + \bar{q} \quad (27)$$

We define a pair of vectors d and e that represent the x, y, and z, components of the vectors p and q as follows:

$$\begin{cases} \bar{d} = [\bar{p}(1) \quad \bar{p}(2) \quad \bar{p}(3)]^T \\ \bar{e} = [\bar{q}(1) \quad \bar{q}(2) \quad \bar{q}(3)]^T \end{cases} \quad (28a)$$

and a pair of scalars f and g that represent the time offset b components of the vectors p and q as follows:

$$\begin{cases} f = \bar{p}(4) \\ g = \bar{q}(4) \end{cases} \quad (28b)$$

Therefore, we can see that:

$$\bar{x} = \bar{d}\lambda + \bar{e} \quad (28c)$$

$$|\bar{x}|^2 = |\bar{d}\lambda + \bar{e}|^2 \quad (28d)$$

Therefore:

$$\lambda = |\bar{x}|^2 = |\bar{d}\lambda + \bar{e}|^2 = |\bar{d}|^2\lambda^2 + 2<\bar{d},\bar{e}>\lambda + |\bar{e}|^2 \quad (29a)$$

By subtracting $\lambda$ from both sides of Equation 29a, the equality is set to zero:

$$|\bar{d}|^2\lambda^2 + (2<\bar{d},\bar{e}>-1)\lambda + |\bar{e}|^2 = 0 \quad (29b)$$

Equation (29b) is a second order equation in $\lambda$ and has the following solutions:

$$\lambda_1 = \frac{-(2<\bar{d},\bar{e}>-1)+\sqrt{(2<\bar{d},\bar{e}>-1)^2-4|\bar{d}|^2|\bar{e}|^2}}{2|\bar{d}|^2} \quad (30)$$

$$\lambda_2 = \frac{-(2<\bar{d},\bar{e}>-1)-\sqrt{(2<\bar{d},\bar{e}>-1)^2-4|\bar{d}|^2|\bar{e}|^2}}{2|\bar{d}|^2}$$

We can find the solutions that correspond to these two values of $\lambda$ by substituting them into the definition of the system variables as a function of $\lambda$:

$$\bar{u}_1 = \bar{p}\lambda_1 + \bar{q} \quad (31)$$
$$\bar{u}_2 = \bar{p}\lambda_2 + \bar{q}$$

To distinguish the correct solution, we substitute these two solutions back into the system of equations to find the solution that yields very small residuals. If both solutions yield small residuals, the system has two ambiguous solutions.

Base Station Measurements as Range Differences

The mobile station measures the time difference of arrival of the pilot signal from different base stations. These measurements can be treated as range differences. In a system using both GPS and LORAN, LORAN measurements may be treated as range differences. We assume, without loss of generality, that one of the base stations (say $b_0$) is the reference for all the range difference measurements and that this base station is the origin of the coordinate frame. Therefore, the range difference measurements can be expressed as:

$$\delta_{bi} = |\bar{x} - \bar{x}_{bi}| - |\bar{x}| \quad (32)$$

For each one of the measurements we perform the following manipulation:

$$(\delta_{bi} + |\bar{x}|)^2 = |\bar{x} - \bar{x}_{bi}|^2 \quad (33a)$$

Expand both sides:

$$\delta_{bi}^2 + 2\delta_{bi}|\bar{x}| + |\bar{x}|^2 = |\bar{x}|^2 - 2\langle\bar{x},\bar{x}_{bi}\rangle + |\bar{x}_{bi}|^2 \quad (33b)$$

Then collect the second order terms on the right side of the equation:

$$2\langle\bar{x},\bar{x}_{bi}\rangle = -2\delta_{bi}|\bar{x}| + |\bar{x}_{bi}|^2 - \delta_{bi}^2 \quad (33c)$$

A quadratic variable is defined as $\lambda = |\bar{x}|$. Equation (33c) can be written as:

$$2\langle\bar{x},\bar{x}_{bi}\rangle = -2\delta_{bi}\lambda + |\bar{x}_{bi}|^2 - \delta_{bi}^2 \quad (34)$$

We can perform the manipulations in Equations (33) and (34) on all the range difference measurements. The system of equations can then be written as:

$$A_B \bar{u} = \quad (35)$$

$$\bar{l}_b \lambda + \bar{c}_b \Leftrightarrow \begin{bmatrix} 2x_{b1} & 2y_{b1} & 2z_{b1} & 0 \\ 2x_{b2} & 2y_{b2} & 2z_{b2} & 0 \\ \vdots & \vdots & \vdots & \vdots \\ 2x_{bn} & 2y_{bn} & 2z_{bn} & 0 \end{bmatrix} \begin{bmatrix} x \\ y \\ z \\ b \end{bmatrix} = \begin{bmatrix} -2\delta_{b1} \\ -2\delta_{b2} \\ \vdots \\ -2\delta_{bn} \end{bmatrix} \lambda + \begin{bmatrix} |\bar{x}_{b1}|^2 - \delta_{b1}^2 \\ |\bar{x}_{b2}|^2 - \delta_{b2}^2 \\ \vdots \\ |\bar{x}_{bn}|^2 - \delta_{bn}^2 \end{bmatrix}$$

The altitude aiding, satellite and time bias measurement equations as defined in Equations (6), (9), and (11) can be added to the system at this stage. The sets of equations can be concatenated so as to obtain a single set of equations:

$$A\bar{u} = \bar{l}\lambda + \bar{c} = \begin{bmatrix} A_S \\ A_B \\ A_T \\ A_A \end{bmatrix} \bar{u} = \begin{bmatrix} 0 \\ \bar{l}_b \\ 0 \\ 0 \end{bmatrix} \lambda + \begin{bmatrix} \bar{c}_s \\ \bar{c}_b \\ c_t \\ c_a \end{bmatrix} \quad (36)$$

Let B be the generalized inverse of A (Note that the covariance matrix in this case is not the same as the covariance matrix of the measurements), then:

$$\bar{u} = B \times (\bar{l}\lambda + \bar{c}) = B \times \bar{l}\lambda + B \times \bar{c} = \bar{p}\lambda + \bar{q} \quad (37)$$

At this point we define two new vectors d and e and two new scalars f and g:

$$\begin{cases} \bar{d} = [\bar{p}(1) \; \bar{p}(2) \; \bar{p}(3)]^T \\ \bar{e} = [\bar{q}(1) \; \bar{q}(2) \; \bar{q}(3)]^T \end{cases} \text{ and } \begin{cases} f = \bar{p}(4) \\ g = \bar{q}(4) \end{cases} \quad (38)$$

$\bar{p}(1) \; \bar{p}(2) \; \bar{p}(3)$ are the x, y and z components of the vector p.

$\bar{q}(1) \; \bar{q}(2) \; \bar{q}(3)$ are the x, y and z components of the vector q.

$\bar{p}(4)$ is the b component of the vector p.

$\bar{q}(4)$ is the b component of the vector q.

This allows the x, y, and z components to be treated separately from the b component.

If we substitute Equation 38 into Equation 37, we get:

$$\bar{u} = \bar{p}\lambda + \bar{q} = \bar{d}\lambda + e + f\lambda + g$$

It should be seen that:

$$\bar{x} = \bar{d}\lambda + e$$

Accordingly, the system unknowns x, y, and z can be expressed as a function of $\lambda$ as follows:

$$\lambda = |\bar{x}| \Leftrightarrow \lambda^2 = |\bar{x}|^2 = |\bar{d}\lambda + \bar{e}|^2 = |\bar{d}|^2 \lambda^2 + 2\langle \bar{d}, \bar{e} \rangle \lambda + |\bar{e}|^2 \quad (39a)$$

Equation 39a is set equal to zero by subtracting $\lambda$ from both sides:

$$(|\bar{d}|^2 - 1)\lambda^2 + 2\langle \bar{d}, \bar{e} \rangle \lambda + |\bar{e}|^2 = 0 \quad (39b)$$

Equation (39b) is a second order equation in $\lambda$, and has the following solutions:

$$\lambda_1 = \frac{-2\langle \bar{d}, \bar{e} \rangle + \sqrt{(2\langle \bar{d}, \bar{e} \rangle)^2 - 4(|\bar{d}|^2 - 1)|\bar{e}|^2}}{2(|\bar{d}|^2 - 1)} \quad (40)$$

$$\lambda_2 = \frac{-2\langle \bar{d}, \bar{e} \rangle - \sqrt{(2\langle \bar{d}, \bar{e} \rangle)^2 - 4(|\bar{d}|^2 - 1)|\bar{e}|^2}}{2(|\bar{d}|^2 - 1)}$$

We can find the solutions that correspond to these two values of λ by substituting them into the definition of the system variables as a function of λ:

$$\bar{u}_1 = \bar{p}\lambda_1 + \bar{q} \quad (41)$$
$$\bar{u}_2 = \bar{p}\lambda_2 + \bar{q}$$

Ambiguity Resolution

Algebraic resolutions of quadratic systems always yield two solutions, even in case of redundancy. In accordance with one embodiment of the disclosed method and apparatus, to distinguish the correct solution, we substitute these two solutions back into the system of equations to find the solution that yields small residuals. If both solutions yield small residuals, the system has two ambiguous solutions. The correct solution will be the one that is consistent with the sector information associated with the base station measurements. Alternatively, it will be understood by those skilled in the art that any of the method used to determine the initial estimate of the location sought may also be used to assist in resolving the ambiguity (i.e., select one of the two solutions). For example, the sector that is in communication with the device whose location is being sought may eliminate one of the solutions, alternatively, the location of the serving base station, the altitude of the device as determined by an altitude sensor within the device, or any other information that might be used to limit the possibility that one of the solutions is more likely to be correct. As noted above, some of the criteria that can be used to resolve the ambiguity include, but are not limited to: (1) sector angle opening (i.e., the angular size of the sector) and orientation, (2) distance to serving base station relative to expected cell size, (3) relative LMS cost of the two solutions in the case where there is redundancy, (4) received signal power and (5) Coverage maps available for network planning.

Figure 7:
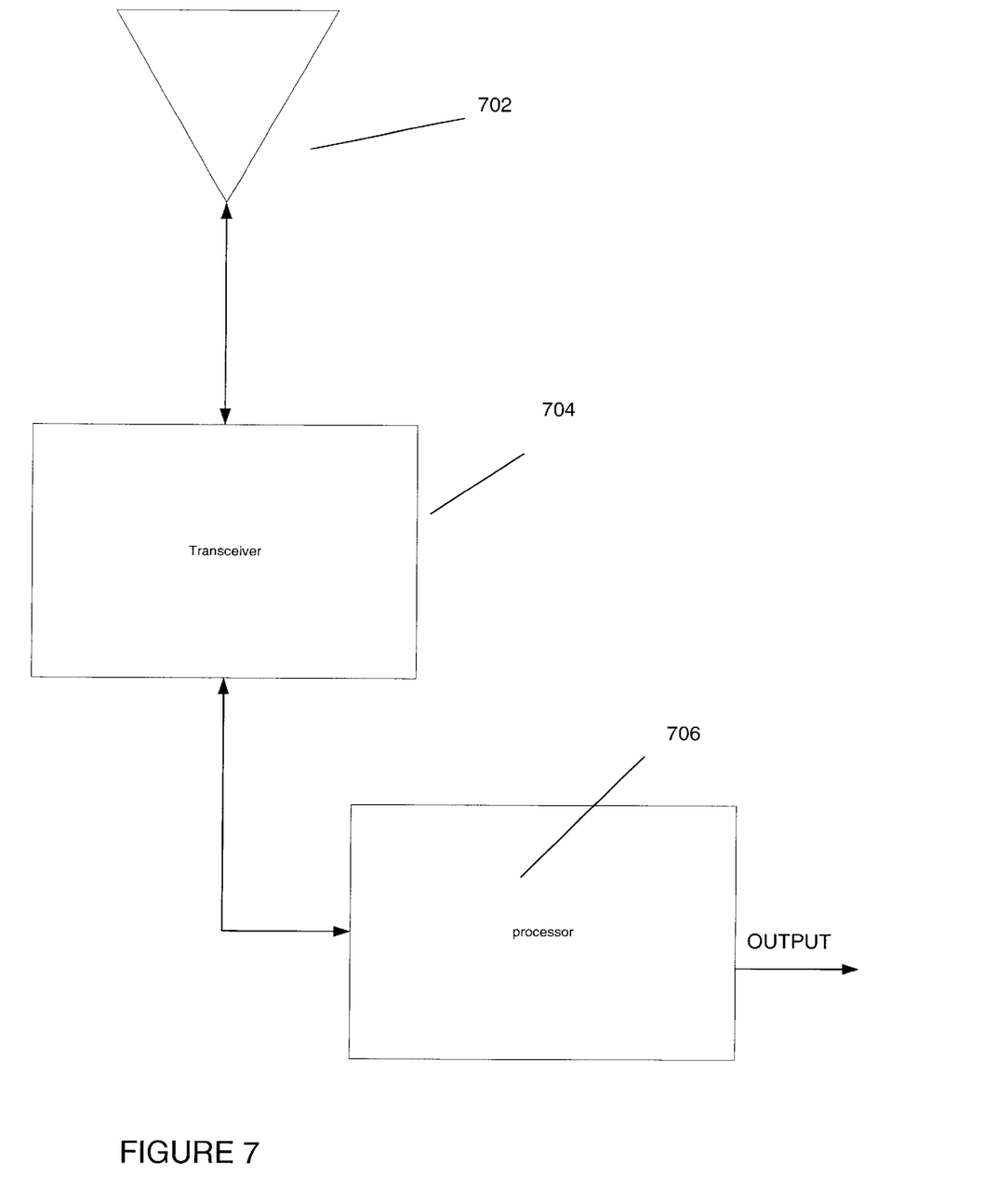
FIG. 7 shows the structure of one example of a device used to implement the disclosed method and apparatus.

FIG. 7 shows the structure of one device 700 used to implement the disclosed method and apparatus. As shown in FIG. 7, the device 700 includes an antenna 702, a transceiver 704, and a processor 706. The antenna receives signals from each of the signal sources, such as satellites and terrestrial transceiver stations. The signals are coupled from the antenna 702 to the transceiver 704. The signals are then processed by the transceiver 704 in a manner well-known to those skilled in the art. The transceiver may be an analog communications transceiver, digital communications transceiver, GPS position location transceiver, Loran transceiver, or any combination of these or other types of transceivers. The processed signals are then coupled to the processor 706. The processor 706 may be any type of computational device that is capable of performing the functions described above, including a general purpose microprocessor including memory, a special purpose microprocessor including memory, an application specific integrated circuit (ASIC) (or portion of an ASIC), dedicated circuitry comprising discrete components, a state machine, or any general purpose computer, including mini-computer, desktop computer, laptop computer, or mainframe computer. The processor 706 outputs the location of the device 700. It should be understood that the processing functions performed by the processor 700 may be distributed among several components that may or may not reside in the same physical location. For example, it is common for information to be collected by a device and transmitted to an external device, such as position determination equipment (PDE) which performs some of the required calculations and manipulations.

It should be noted that the preferred embodiments described above are cited by way of example, and the full scope of the invention is limited only by the claims. For example, while the application notes the use of communication base stations in several examples above, the terrestrial transceiver stations may be any station capable of providing signals that would accommodate the current method and apparatus for determining position location. Likewise, the satellites referred to in many of the above examples are GPS satellites. Nonetheless, it will be understood that the satellites may be any system which provides additional signals that provide position location that can be used as described above for position location determinations.

We claim:

1. A method for determining in a processing unit the location of a device including:
    a) receiving range information, pseudo-range information, and difference of arrival information related to a particular location sought to be determined, the range information being the distance between the location of the device and a first transmission point, the pseudo-range information being the distance between the location of the device and a second transmission point plus a clock bias, and the difference of arrival information being the difference between the time at which a reference signal transmitted from a third transmission point arrived at the location of the device and the time at which a second signal transmitted from a fourth transmission point arrived at the location of the device;
    b) using a plane-wave approximation to eliminate any unknown second order terms associated with the pseudo-range information;
    c) substituting a first quadratic variable for any unknown second order terms in the range information;
    d) constructing a coordinate frame with one of the transmission points associated with the range information, the pseudo-range information, or the difference of arrival information as the origin of the coordinate frame;
    e) expressing as a set of equations, the range difference of arrival, range, and pseudo-range information in terms of the newly constructed coordinate frame;
    f) substituting a second quadratic variable for the coordinates of the unknown location, thus placing the equation for the difference of arrival, range, and pseudo-range information in the same form;
    g) concatenating the equations for the range, pseudo-range and difference of arrival information into a single set of equations;
    h) expressing the coordinates of the location of the device and the time bias as a function of the quadratic variable;
    i) solving for the second quadratic variable, and thus determining two solutions for the location sought; and
    j) outputting the location sought.

2. A method of determining in a processing unit the position of a device, including:
    a) selecting an initial position estimate having an assumed accuracy;
    b) linearlizing second order satellite and altitude aiding measurements around the initial estimate;
    c) solving for the position of the device using the linearized satellite and altitude aiding measurements;
    d) disregarding any solution for the position of the device that is more inaccurate than the assumed accuracy of the initial position estimate;

e) accepting any solution for the position of the device that is more accurate than the assumed accuracy of the initial position estimate; and f) output the acceptable solutions for the position of the device.

3. The method of claim 2, wherein at least one of the acceptable solutions for the position of the device is used as an initial point for an iterative determination of the location of the position sought.

4. The method of claim 2, further including:

a) using at least one of the following criteria to identify a correction solution for the position of the device if more than one solution is more accurate than the assumed accuracy of the initial position estimate:
  i) sector angle opening and orientation;
  ii) distance to serving base station relative to expected cell size;
  iii) relative Least Mean Square (LMS) cost of the two solutions for the position of the device in the case where there is reduncancy;
  iv) received signal power; and
  v) coverage maps available for network planning.

5. A method of determining in a processing unit the coordinates, and thus the location, of a mobile device, including:

a) receiving altitude aiding information in the form of earth center, earth fixed (ECEF) coordinates representing the location of the mobile device;

b) rotating the ECEF coordinate frame such that the z-axis passes through a point selected as an initial estimate of the location of the mobile device;

c) using the altitude aiding information to provide the value of the z coordinate in the new coordinate frame;

d) receiving one or more of range, pseudo-range, and range difference information;

e) solving for time bias, the y coordinate of the mobile device, and the x coordinate for the mobile device using one of more of the received range, pseudo-range, and range difference information; and f) outputting the x, y, z coordinates of the mobile device.

* * * * *